United States Patent
Roberts et al.

(10) Patent No.: US 6,942,795 B2
(45) Date of Patent: Sep. 13, 2005

(54) MODULAR FILTER SYSTEM AND METHOD OF REPAIRING AND/OR REPLACING COMPONENTS THEREOF

(75) Inventors: R. Lee Roberts, Chadds Ford, PA (US); Mark Kevin Addison, Bear, DE (US)

(73) Assignee: RG Delaware, Inc., Wilmington, DE (US)

( * ) Notice: Subject to any disclaimer, the term of this patent is extended or adjusted under 35 U.S.C. 154(b) by 0 days.

(21) Appl. No.: 10/355,082

(22) Filed: Jan. 31, 2003

(65) Prior Publication Data

US 2004/0149641 A1 Aug. 5, 2004

(51) Int. Cl.[7] .............................................. B01D 23/24
(52) U.S. Cl. ...................... 210/264; 210/276; 210/292; 210/271; 210/273; 210/274; 210/275; 210/793; 210/188; 210/136; 210/86
(58) Field of Search ................................ 210/264, 276, 210/292, 136, 273–275, 793, 188, 86, 271

(56) References Cited

U.S. PATENT DOCUMENTS

| | | | |
|---|---|---|---|
| 2,302,449 A | 11/1942 | Laughlin | |
| 2,302,450 A | 11/1942 | Laughlin | |
| 3,984,326 A | 10/1976 | Bendel | |
| 4,152,265 A | * 5/1979 | Meyers | 210/273 |
| 4,189,386 A | * 2/1980 | Aman | 210/235 |
| 4,308,141 A | 12/1981 | Clendenen | |
| 4,764,288 A | 8/1988 | Walker | |
| 4,859,330 A | * 8/1989 | Pauwels | 210/264 |
| 4,957,631 A | * 9/1990 | Pauwels | 210/264 |
| 4,988,439 A | * 1/1991 | Medders, II | 210/264 |
| 5,286,392 A | * 2/1994 | Shea | 210/793 |
| 5,401,405 A | * 3/1995 | McDougald | 210/273 |

* cited by examiner

*Primary Examiner*—Duane Smith
*Assistant Examiner*—Minh-Chau T. Pham
(74) *Attorney, Agent, or Firm*—Merek, Blackmon & Voorhees, LLC

(57) ABSTRACT

A modular filter system and a method of repairing and/or replacing one or more components thereof. The modular filter system includes a traveling backwash hood assembly and a plurality of filter cells having media contained therein. The traveling backwash hood assembly includes a hood and a baffle assembly. Preferably, the hood has at least one opening formed therein and a cover plate operably associated with the at least one opening. The baffle assembly includes a plurality of baffles for directing the flow of fluid. The baffle assembly is detachably connected to the hood to permit the baffle assembly to be moved relative to the hood to permit an individual to readily gain access to the baffle assembly to repair or replace one or more components thereof.

4 Claims, 2 Drawing Sheets

MODULAR FILTER SYSTEM AND METHOD OF REPAIRING AND/OR REPLACING COMPONENTS THEREOF

FIELD OF THE INVENTION

The present invention is directed to a modular filter system for filtering water and/or wastewater and a method of repairing or replacing components thereof.

BACKGROUND OF THE INVENTION

Modular filter systems, i.e., filter systems having a plurality of filter compartments or cells rather than a single large filter bed for a given unit, were primarily developed to reduce the size and complexity of the backwash or cleaning structure of single, large filter beds as well as obviate the need for a total system shutdown during the backwash or cleaning procedure. One such modular filter system is disclosed in U.S. Pat. No. 4,308,141 ("'141 patent") the entire contents of which are incorporated herein by reference.

The '141 patent discloses a filter system that utilizes a tank or reservoir having a transversely positioned porous plate filter element vertically spaced above the floor or bottom of the reservoir. Wall partitions are used to divide the tank into a plurality of smaller individual compartments or cells that have a common underdrain and plenum chamber. Water containing undesired suspended particulate matter is introduced into the reservoir to filter the same. Gravity causes the influent to pass through the media in each of the cells or compartments. The filtered water or effluent is drawn away by a drain or effluent discharge located beneath or in the lower portion of the filter that communicates with the common plenum.

After a period of time of operating the modular filter system of the '141 patent to filter influent, the system requires cleaning or backwashing to remove the particulate matter collected in the media contained in the individual cells. Because the cells are backwashed sequentially, the filter system never needs to be shutdown for a backwash or a filter cleaning cycle and all of the filter cells except the one being cleaned are operable continuously.

The backwash system of the '141 patent includes a hydraulically isolating backwash hood assembly and associated carriage and platform support assembly. The backwash hood assembly depends from the mobile carriage and platform assembly and is initially centered over one of the six individual cells. Subsequently, the hood assembly is lowered to form a watertight seal with a particular cell to be backwashed. A backwash pump is activated creating a negative pressure within the backwash hood. Effluent created by adjacent individual cells is drawn up from the common underdrain through the media in the cell being backwashed to expand and wash the media. The effluent used to backwash a given cell is directed to waste through the hood assembly. This procedure is subsequently performed on all the remaining individual cells.

In the commercial application of the '141 patent, the effluent discharge is closed during the backwash procedure. Hence, all effluent from a given bank of cells having a common plenum during backwashing is directed to waste through the hood assembly. Once backwashing is complete, the effluent valve is opened thereby directing the effluent to a storage tank or other suitable location for storing filtered water.

Neither the '141 patent or its commercial embodiment provides means for readily permitting repair or replacement of components of the hood assembly including but not limited to the baffle assembly contained within the hood assembly. This is an inherent disadvantage, since components of the hood assembly cannot be readily repaired or replaced.

The present invention overcomes the disadvantages of the '141 patent and its commercial embodiment by providing a novel and unobvious modular filter system and a method of repairing or replacing components thereof.

OBJECTS AND SUMMARY OF THE INVENTION

An object of the preferred embodiment of the present invention is to provide a novel and unobvious modular filter system.

Another object of a preferred embodiment of the present invention is to provide a modular filter system that overcomes one or more disadvantages of previously known modular filter systems.

A further object of a preferred embodiment of the present invention is to provide a filter system that permits individuals to readily repair and/or replace one or more components of the system.

Yet still another object of the present invention is to provide a method of repairing or replacing one or more components of a modular filter system.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one aspect of the present invention is directed to a modular filter system designed to permit one or more components of the system to be readily repaired or replaced. Another aspect of the present invention is directed to a method of repairing or replacing one or more components of a modular filter system.

DETAILED DESCRIPTION OF THE PREFERRED EMBODIMENT OF THE INVENTION

The most preferred forms of the invention will now be described with reference to FIGS. 1–3. The appended claims are not limited to the most preferred forms and no term used herein is to be given a meaning other than its ordinary meaning unless accompanied by a statement that the term "as used herein is defined as follows".

Figure 1:
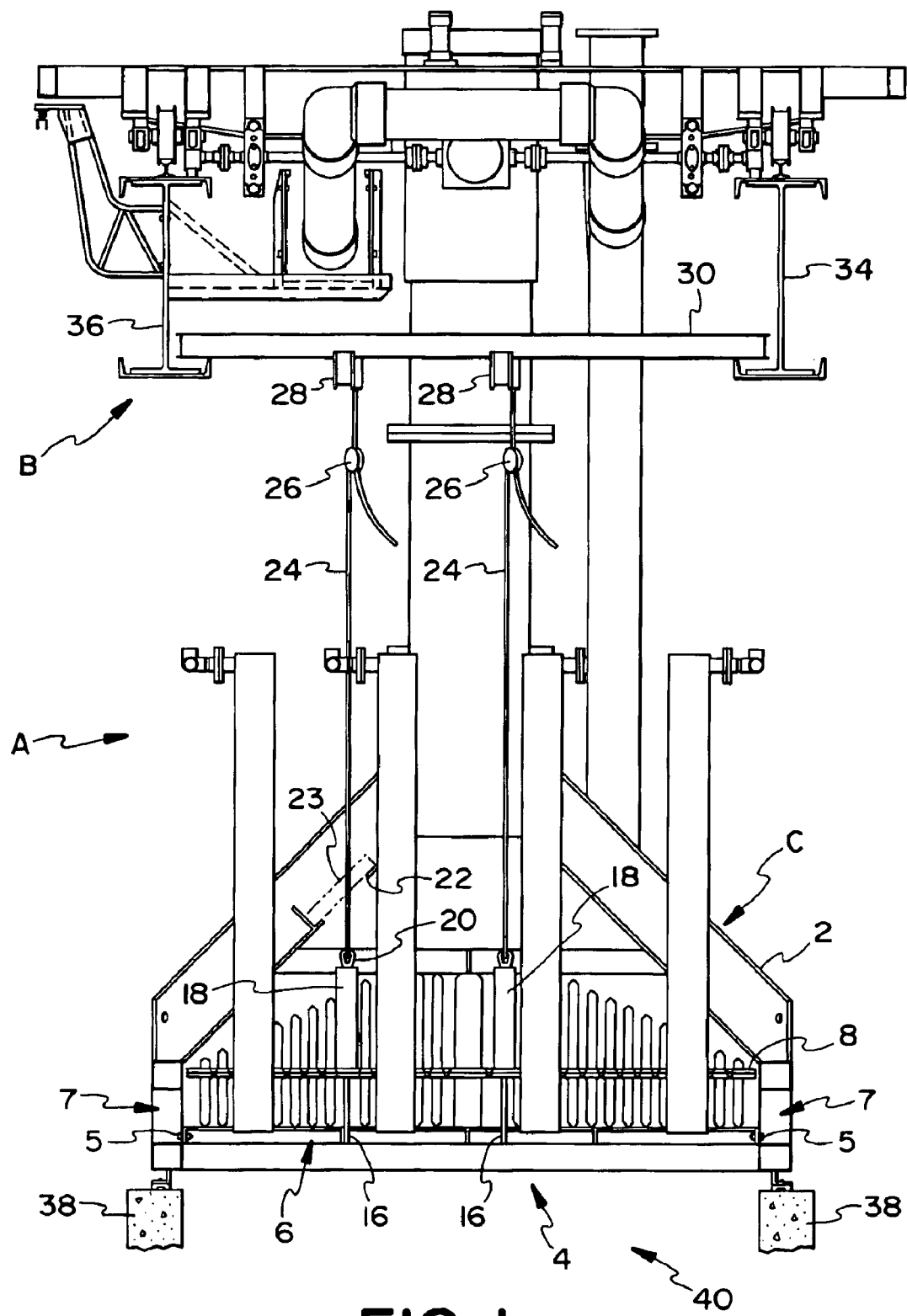
FIG. 1 is an elevational view of a portion of a filter system formed in accordance with the most preferred embodiment of the present invention.
Figure 2:
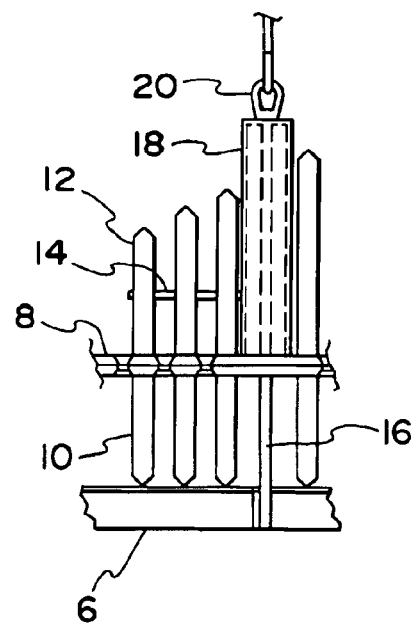
FIG. 2 is a fragmentary elevational view of a portion of the baffle assembly of the filter system depicted in FIG. 1.
Figure 3:
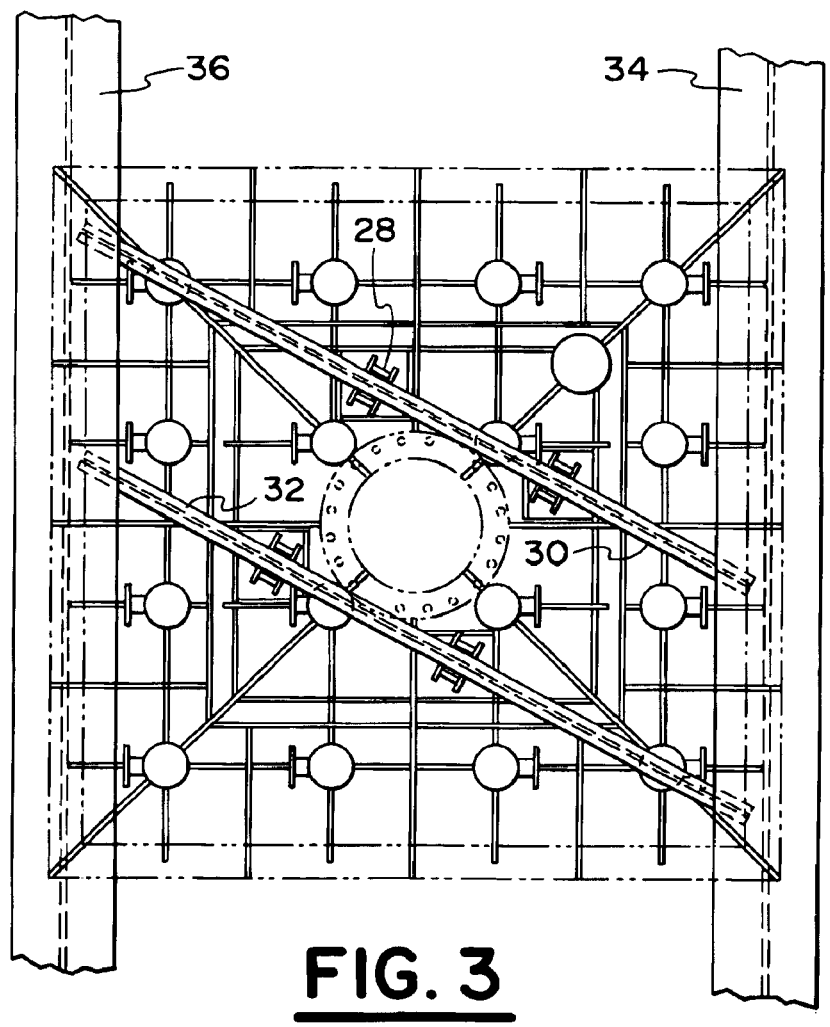
FIG. 3 is a plan view of the filter system depicted in FIG. 1.

FIGS. 1 Through 3

Referring to FIGS. 1 to 3, a portion of a modular filter system A is illustrated in one of many possible configurations. The omitted details of the modular filter system A and their interrelationship with the illustrated portions will be readily appreciated by one of ordinary skill in the art from the present disclosure and the disclosure of the '141 patent.

The modular filter system A includes a carriage assembly B and a traveling backwash hood assembly C. Movement of the traveling backwash hood assembly C is accomplished via the carriage assembly B. The carriage assembly B is similar in construction and design to the carriage assembly described in the '141 patent and, therefore, the assembly will not be described in detail. It will be readily appreciated that the carriage assembly B may be modified in any desired manner.

The traveling backwash hood assembly C includes two main components, i.e., a hood 2 and a baffle assembly 4. In the most preferred design of the present invention, the baffle assembly 4 is detachably connected to the hood 2 via bolts 5 so that the baffle assembly 4 can be moved relative to the hood 2 when the two components are detached from each other. The bolts 5 are accessible from the exterior of the hood 2 through gaps 7. The reason for detachably connecting the hood 2 and the baffle assembly 4 is to allow ready access to the baffle assembly 4 to permit repair and replacement as is explained below. While the detachable connection between hood 2 and baffle assembly 4 is the preferred means of permitting access to the baffle assembly 4, it will be readily appreciated that other means could be employed within the scope of the present invention.

The baffle assembly 4 preferably includes a lower baffle support 6, a baffle distributor 8, lower baffles 10 and upper baffles 12. Plastic spacers 14 may be used to maintain the proper spacing between adjacent baffles. A plurality of rods 16 preferably of a corrosion resistant material extend upwardly from the lower baffle support 6 and abut the baffle distributor 8 to support the baffle distributor 8. Preferably, four collars (only two of which are shown) 18 are secured over the corresponding rod 16 via conventional fasteners to maintain the baffle assembly 4 securely together as a unit. Preferably, rods 16 have eyelets 20 removably threaded on their uppermost end. In this manner the eyelets may be removed during normal operation of the filter system to avoid corrosion.

The uppermost ends of rods 16 are each disposed adjacent an opening 22 formed in the hood 2. When the modular filter system A is in either the filtration mode or the backwashing mode, the opening 22 is covered with a suitably sized plate 23 (shown in phantom) or other means to seal the opening 22. When it is necessary to repair or replace portions of the baffle assembly 4, the plates or other means are removed exposing the eyelets 20 so that cables 24 can be connected thereto. Cables 24 pass over corresponding hoists 26. Preferably, two beam clamps 28 extend downwardly from a pair of I-beams 30 and 32 best seen in FIG. 3. It should be noted that the I-beams 30 and 32 are preferably only used during servicing and are removed when the system is operating. Hoists 26 are supported by the corresponding beam clamps 28. The I-beams 30 and 32 are suspended between bridge beams 34 and 36.

The preferred method of repairing and/or replacing components of the traveling backwash hood C will now be described. First, media is removed from one of the plurality of filter cells. This step may be obviated if the predetermined filter cell is of a sufficient depth to receive the filter assembly 4 without removal of the media. The media in any given cell can be of any conventional type and can be formed in one or more layers. It will also be appreciated that the number and configuration of the filter cells may vary from that disclosed in the '141 patent. The upper portion of the sidewalls 38 of a filter cell 40 are depicted in FIG. 1 with the traveling backwash hood C resting thereon. Filter cell 40 is preferably located adjacent the filter cell from which media has been removed. Once media from the predetermined filter cell has been removed, the traveling backwash hood C is positioned over the predetermined filter cell.

I-beams 30 and 32 are then temporarily positioned between bridge beams 34 and 36. Preferably, two hoists 26 are installed on each of the I-beams 30 and 32 using beam clamps 28. It will be readily appreciated that other support structures may be used. The plates 23 covering openings 22 are removed to expose eyelets 20. Subsequently, cables 24 are connected to the corresponding eyelets 20. After the slack in the cables 24 is taken up, bolts 5 are removed thereby allowing the baffle assembly 4 to move relative to the hood 2. Preferably, the baffle is sized so that it can be lowered into any of the filter cells of the modular filter system. The baffle assembly 4 is then lowered into the predetermined filter cell. The lowering of the baffle assembly 4 obviates the need for an individual to be located under the baffle assembly 4 during servicing. Lifting lines (not shown) are attached to each of the cables 24. Subsequently, the cables 24 are allowed to drop down into the hood 2. The lifting lines make it easier to raise cables 24 through the openings 22 when the baffle assembly 4 is eventually raised. The traveling backwash hood C is moved to an adjacent filter cell thereby exposing the baffle assembly 4 so that components thereof may be repaired or replaced. To reinstall the baffle assembly 4, the aforementioned procedure is merely reversed. It will be readily appreciated that the order of the steps set forth above may be varied.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment.

We claim:

1. A traveling backwash hood assembly for use with a modular filter system having a plurality of filter cells, said traveling backwash hood assembly comprising:

(a) a hood, said hood having at least one opening formed therein and a cover plate operably associated with said opening;

(b) a baffle assembly including a plurality of baffles for directing the flow of fluid; and, (c) means for detachably connecting said baffle assembly to said hood.

2. A method of repairing and/or replacing at least one component of a modular filter system having a traveling backwash hood assembly and a plurality of filter cells having media formed therein, the method comprising the steps of:

(a) providing a traveling backwash hood assembly having a hood and a baffle assembly detachably connected to said hood;

(b) positioning the traveling backwash hood assembly over a predetermined filter cell;

(c) detaching the hood from the baffle assembly; and, (d) lowering the baffle assembly into the predetermined filter cell to repair or replace one or more components of the traveling hood assembly.

3. The method as recited in claim 2 including the further step of:

(a) removing filter media from the predetermined filter cell prior to step (d) set forth in claim 2.

4. A traveling backwash hood assembly for use with a modular filter system having a plurality of filter cells, said traveling backwash hood assembly comprising:

(a) a hood, said hood having at least one opening formed therein and a cover plate operably associated with said opening;

(b) a baffle assembly including a plurality of baffles for directing the flow of fluid; and, (c) a detachment member for detachably connecting said baffle assembly to said hood.

* * * * *